(12) United States Patent
Kwong et al.

(10) Patent No.: US 8,819,097 B2
(45) Date of Patent: Aug. 26, 2014

(54) CONSTANT GEOMETRY SPLIT RADIX FFT

(75) Inventors: Joyce Y. Kwong, Dallas, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 473 days.

(21) Appl. No.: 13/229,470

(22) Filed: Sep. 9, 2011

(65) Prior Publication Data

US 2013/0066932 A1    Mar. 14, 2013

(51) Int. Cl.
*G06F 17/10*    (2006.01)
(52) U.S. Cl.
USPC ............ 708/404; 708/200; 708/400; 708/403
(58) Field of Classification Search
None
See application file for complete search history.

(56) References Cited

U.S. PATENT DOCUMENTS

| | | | | |
|---|---|---|---|---|
| 6,742,009 B1 * | 5/2004 | Kwak et al. | ................. | 708/401 |
| 2005/0182806 A1 * | 8/2005 | Krishnamoorthi et al. | ... | 708/404 |

OTHER PUBLICATIONS

"A 1-GS/s FFT/IFFT Processor for UWB Applications," IEEE Journal of Solid-State Circuits, vol. 40, No. 8, Aug. 2005, pp. 1726-1735 (Lin, et al.).
A 2.4-GS/s FFT Processor for OFDM-Based WPAN Applications, IEEE Transactions on Circuits and Systems—II: Express Briefs, vol. 57, No. 6, Jun. 2010, pp. 451-455 (Tang, et al.).
"A High-Speed Low-Complexity Modified Radix-25 FFT Processor for Gigabit WPAN Applications," IEEE International Symposium on Circuits and System, May 2011, pp. 1259-1262 (Cho, et al.).
"A Green FFT Processor with 2.5-GS/s for IEEE 802.15.3c (WPANs)," 2International Conference on Green Circuits and Systems, Jun. 2010, pp. 9-13 (Huang, et al.).
"An Adaptation of tile Fast Fourier Transform for Parallel Processing," Journal of the ACM, Apr. 1968, vol. 15, pp. 252-264 (M.C. Pease).
"Split Radix' FFT Algorithm," Electronics Letters Jan. 5, 1984 vol. 20, No. 1, pp. 14-16 (Duhamel, et al.).
"The Design of a Class of Fast Fourier Transform Computers," IEEE Transactions on Computers, vol. c-20, No. 6, Jun. 1971, pp. 617-623 (M. Corinthios).
"Constant Geometry Split-Radix Algorithms," J. of VLSI Signal Processing, vol. 10, No. 2, Jul. 1995, pp. 141-152.
"Real-valued Fast Fourier Transform Algorithms," Transactions on Acoustics, Speech, and Signal Processing, vol. 'ASSP-35, No. 6, Jun. 1987, pp. 849-863 (Sorensen, et al.).
"Implementing Fast Fourier Transform algorithms of real-valued sequences with the TMS320 DSP platform".
"An Integrated 256-Point Complex FFT Processor for Real-Time Spectrum Analysis and Measurement," IEEE instrumentation and Measurement Technology Conference, Ottawa, Canada, May 19-21, 1997 (Cetin, et al.).

* cited by examiner

*Primary Examiner* — Michael D Yaary
(74) *Attorney, Agent, or Firm* — John R. Pessetto; Wade J. Brady, III; Frederick J. Telecky, Jr.

(57) ABSTRACT

An apparatus for performing a Fast Fourier Transform (FFT) is provided. The apparatus comprises a reorder matrix, symmetrical butterflies, and a memory. The reorder matrix is configured to have a constant geometry, and the butterflies are coupled in parallel to the reorder matrix. The memory is also coupled to the reorder matrix and each butterfly. The reorder matrix, the butterflies, and the memory can then execute a split radix algorithm.

18 Claims, 9 Drawing Sheets

CONSTANT GEOMETRY SPLIT RADIX FFT

TECHNICAL FIELD

The invention relates generally to the computation of a Fast Fourier Transform (FFT) and, more particularly, to computing an FFT using a split radix algorithm.

BACKGROUND

Figure 1:
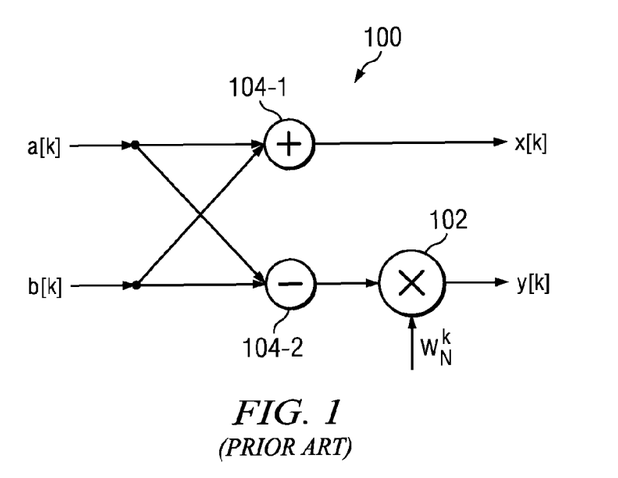
FIG. 1 is a diagram of an example of radix-2 butterfly.
Figure 2:
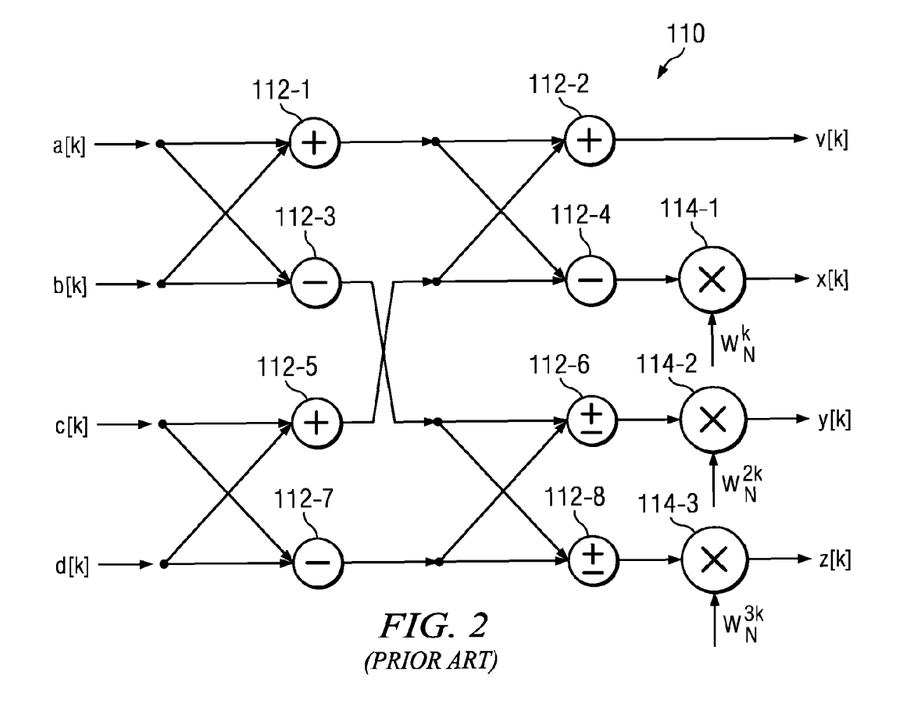
FIG. 2 is a diagram of an example of a radix-4 butterfly.

Conventional FFT circuits employ a number of basic computation elements, known as butterflies, and examples of conventional butterflies 100 and 110 can be seen in FIGS. 1 and 2. As shown, butterfly 100 is a radix-2 (two input) butterfly (which generally employs summing circuits 104-1 and 104-2 and complex multiplier 102), and butterfly 110 is a radix-4 (four input) butterfly (which generally employs summing circuits 112-1 to 112-8 and complex multipliers 114-1 to 114-3). With the FFT computations, the number of butterfly operations is generally:

$$\frac{N}{r}\log_r N, \quad (1)$$

where N is the number of points in the sequence and r is the radix number (i.e., radix-2). So, the throughput is generally limited by the number of butterfly operations executed in parallel.

Figure 3:
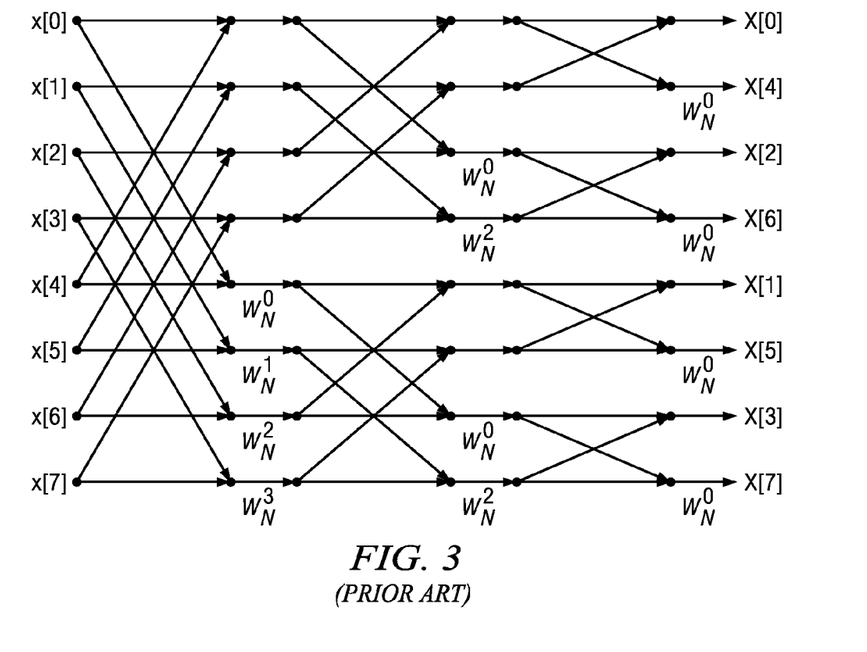
FIG. 3 is an example flow diagram for an 8-point variable geometry radix-2 FFT.
Figure 4:
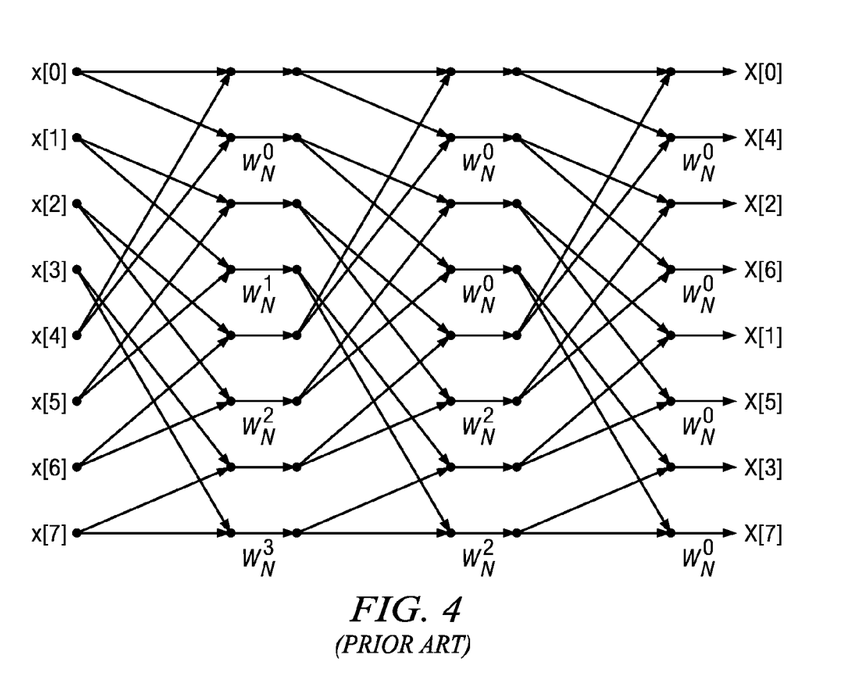
FIG. 4 is an example flow diagram for an 8-point constant geometry radix-2 FFT.

To perform these FFT computations, several types of architectures may be employed, examples of which can be seen in FIGS. 3 and 4. In FIG. 3, a flow graph for an 8-point decimation-in-frequency (DIF) FFT is shown. Here, a variable geometry architecture (usually accomplished through the use of multiplexers), which uses a Cooley-Tukey algorithm, can be seen. The flow graph in FIG. 3 is frequently implemented in pipelined FFT circuits. Namely, these pipelined FFT circuits employ $\log_r N$ datapaths to compute one row of the flow graph, with memory elements at each stage to store the butterfly outputs and ensure entrance to the next stage in the correct order. Typically, in high throughput designs, multiple pipelines were employed to increase speed of computation. In FIG. 4, another flow graph for an 8-point DIF FFT is shown. In this example, the geometry is constant. This is beneficial in that the geometry can be realized with fixed wires or traces, avoiding the overhead of multiplexers. Each of these different architectures, though, has drawbacks (i.e., high switching overhead or high number of non-trivial complex multiplications).

There is also another type of algorithm (known as a split radix) that has some advantages; namely, a split radix algorithm has fewer non-trivial complex multiplications than radix-2 and radix-4 algorithm. For example, for a 64-point FFT, radix-2, radix-4, and split-radix algorithms involve 98, 76, and 72 non-trivial complex multiplications respectively. In typical FFT architectures, the actual number of complex multiplications performed in radix-2 and radix-4 is even higher because multiplying by i ($\sqrt{-1}$) should also be counted. Generally, the split radix algorithm successively decomposes an N-point Discrete Fourier Transform (DFT) into a $$\frac{N}{2}$$

DFT and two $$\frac{N}{4}$$

DFTs as follows:

$$X[2k] = \sum_{n=0}^{\frac{N}{2}-1} \left(x[n] + x\left[n + \frac{N}{2}\right]\right) W_N^{2nk}; \quad (2)$$

$$X[4k+1] = \quad (3)$$

$$\sum_{n=0}^{\frac{N}{4}-1} \left[\left(x[n] - x\left[n + \frac{N}{2}\right]\right) - j\left(x\left[n + \frac{N}{4}\right] - x\left[n + \frac{3N}{4}\right]\right)\right] W_N^n W_N^{4nk}; \text{ and}$$

$$X[4k+3] = \quad (4)$$

$$\sum_{n=0}^{\frac{N}{4}-1} \left[\left(x[n] - x\left[n + \frac{N}{2}\right]\right) + j\left(x\left[n + \frac{N}{4}\right] - x\left[n + \frac{3N}{4}\right]\right)\right] W_N^{3n} W_N^{4nk},$$

where $$W_N^k = e^{-\frac{2\pi ki}{N}}. \quad (5)$$

Figure 5:
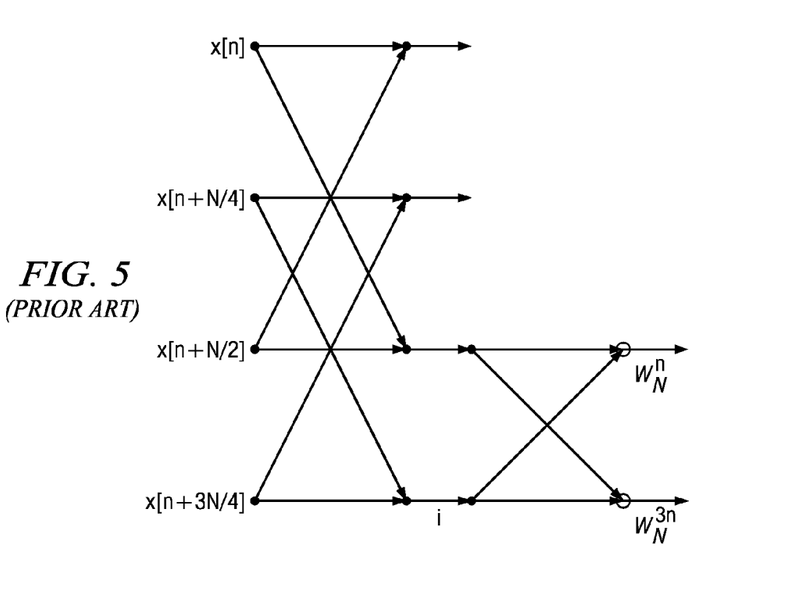
FIG. 5 is a diagram of an example of an "L-shaped" butterfly.
Figure 6:
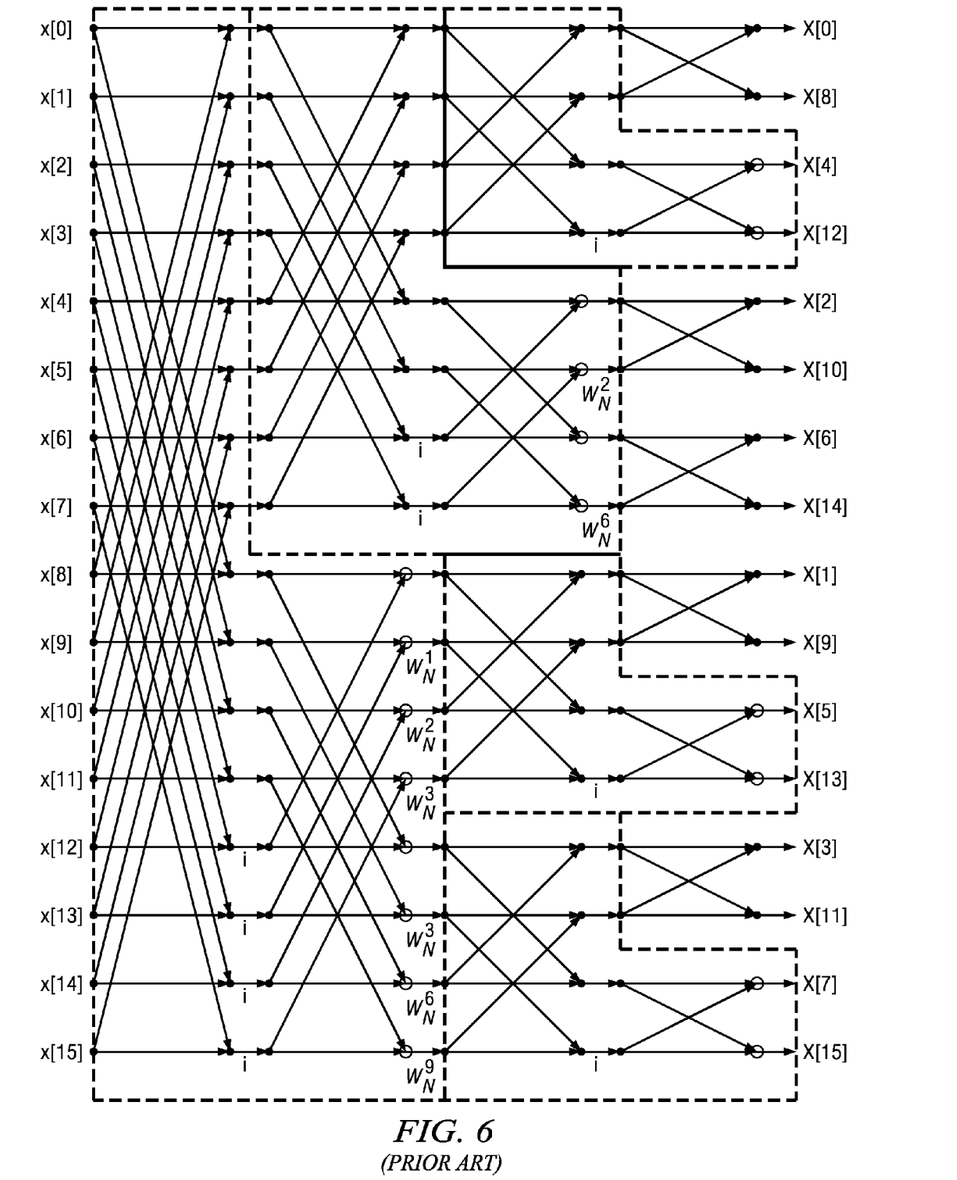
FIGS. 6 and 7 are example flow diagrams for a 16-point variable geometry split radix architecture.
Figure 7:
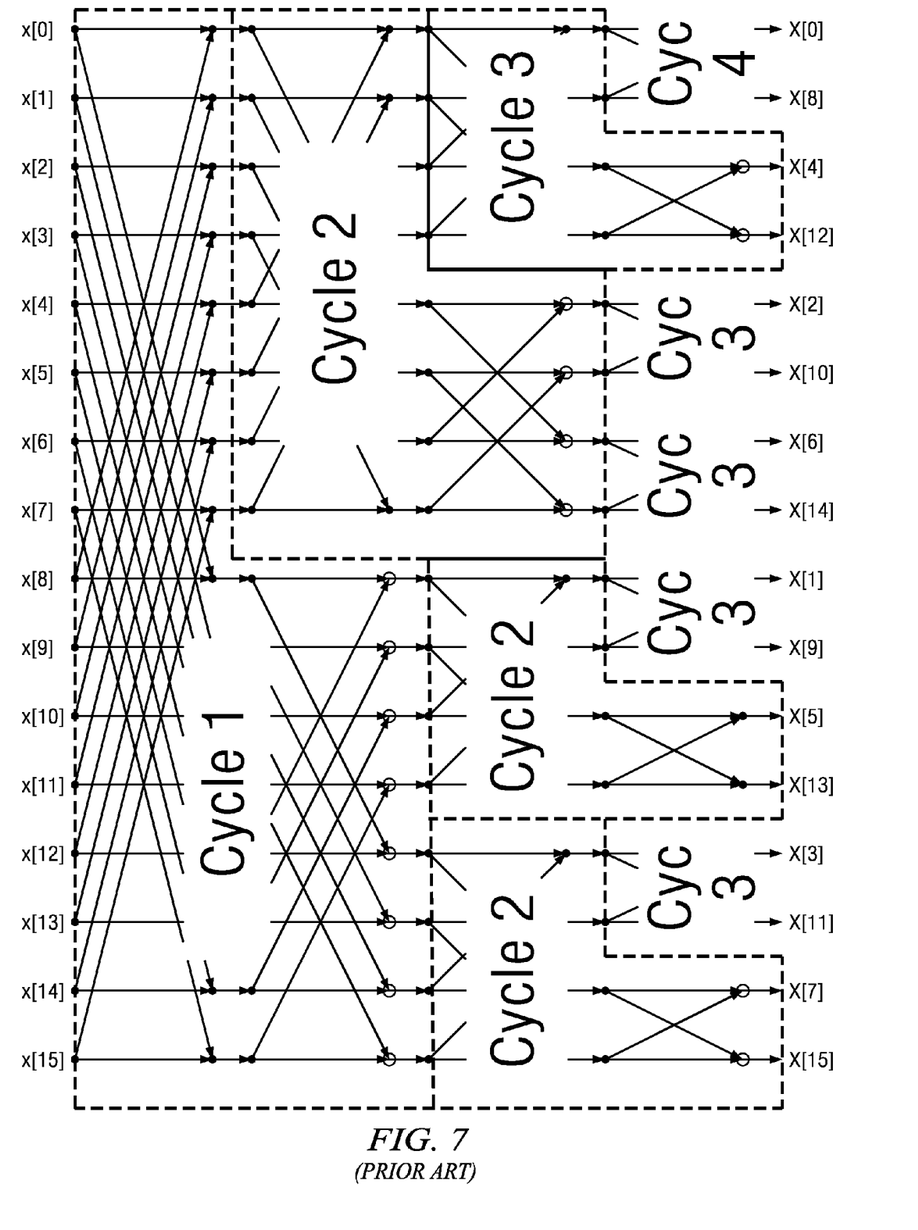

To realize the split radix algorithm in hardware, though, "L-shaped" butterflies (as shown, for example, in FIG. 5) are traditionally employed. The shape of these "L-shaped" butterflies, though, results in irregular scheduling due mainly to uneven latency between datapaths as shown in FIGS. 6 and 7 (which are flow graphs depicting a 16-point variable geometry architecture). Thus, the conventional split radix architecture and algorithm are ill-suited for high throughput applications.

Therefore, there is a need for an improved FFT architecture and algorithm.

Some examples of conventional systems are: Lin, et al., "A 1-GS/s FFT/IFFT processor for UWB applications," *IEEE Journal of Solid-State Circuits*, vol. 40, No. 8, pp. 1726-1735, August 2005; Tang, et al., "A 2.4-GS/s FFT Processor for OFDM-Based WPAN Applications," *IEEE Transactions on Circuits and Systems II: Express Briefs*, vol. 57, no. 6, pp. 451-455, June 2010; Cho, et al., "A high-speed low-complexity modified radix-25 FFT processor for gigabit WPAN applications," in *IEEE International Symposium on Circuits and Systems*, May 2011, pp. 1259-1262; Huang et al., "A green FFT processor with 2.5-GS/s for IEEE 802.15.3c (WPANs)," in *2International Conference on Green Circuits and Systems*, June 2010, pp. 9-13; M. C. Pease, "An adaptation of the Fast Fourier Transform for parallel processing," *Journal of the ACM*, vol. 15, pp. 252-264, April 1968; Duhamel et al., "'Split Radix' FFT Algorithm," *Electronics Letters*, Vol. 20, No. 1, pp. 14-16, 5 1984; [7] M. Corinthios, "The design of a class of Fast Fourier Transform computers," *IEEE Transactions on Computers*, vol. C-20, no. 6, pp. 617-623, June 1971; Argello et al., "Constant geometry split-radix algorithms," *Journal of VLSI Signal Processing*, 1995; Sorensen et al., "Real-valued fast Fourier transform algorithms," *IEEE Transactions on Acoustics, Speech, and Signal Processing*, vol. 35, no. 6, pp. 849-863, June 1987; and R. Matusiak. (2001, August) Implementing Fast Fourier Transform algorithms of real-valued sequences with the TMS320 DSP platform.

SUMMARY

An embodiment of the present invention, accordingly, provides an apparatus. The apparatus comprises a first datapath that generates real and imaginary portions of a first output signal, wherein the first datapath includes: a first summing circuit that receives real portions of a first signal and a second signal; and a second summing that receives imaginary portions of the first and second signals; and a second datapath that generates real and imaginary portions of a second output signal, wherein the second datapath includes: a third summing circuit that receives the real portions of the first and second signals; a multiplexer that is configured to select between the imaginary portion of the first signal and an inverse of the imaginary portion of the first signal based on a control signal; and a fourth summing circuit that receives the imaginary portion of the second signal and that is coupled to an output of the multiplexer, wherein the control signal selects at least one of a first operation and a second operation for the fourth summing circuit; and an output circuit that is coupled to third summing circuit and the fourth summing circuit and that is controlled by the control signal.

In accordance with an embodiment of the present invention, the multiplexer further comprises a first multiplexer, and wherein the output circuit further comprises: a second multiplexer that is coupled to the third and fourth summing circuits and that is controlled by the control signal; and a third multiplexer that is coupled to the third and fourth summing circuits and that is controlled by the control signal.

In accordance with an embodiment of the present invention, the first and second summing circuits further comprise first and second adders, respectively that sum the real and imaginary portions of the first and second signals to generate the real and imaginary portions of the first output signal.

In accordance with an embodiment of the present invention, the third summing circuit is a subtractor.

In accordance with an embodiment of the present invention, the first operation is addition, and wherein the second operation is subtraction.

In accordance with an embodiment of the present invention, the control signal further comprises a first control signal, and wherein a second control signal selects at least one of the first and second operations for the first, second, and third summing circuits, and wherein the first and second control signals selects at least one of a first operation and a second operation for the fourth summing circuit In accordance with an embodiment of the present invention, the first data path further comprises: a first latch that is coupled to first summing circuit and that is controlled by an enable signal; a second latch that is coupled to the second summing circuit and that is controlled by the enable signal; a complex multiplier that is coupled to the first and second latches; a fourth multiplexer that is coupled to the first summing circuit and the complex multiplier and that is controlled by the enable signal; and a fifth multiplexer that is coupled to the second summing circuit and the complex multiplier and that is controlled by the enable signal.

In accordance with an embodiment of the present invention, the enable signal further comprises a first enable signal, and wherein the complex multiplier further comprises a first complex multiplier, and wherein the second data path further comprises: a third latch that is coupled to the second multiplexer and that is controlled by a second enable signal; a fourth latch that is coupled to the third multiplexer and that is controlled by the second enable signal; a second complex multiplier that is coupled to the third and fourth latches; a sixth multiplexer that is coupled to the second multiplexer and the second complex multiplier and that is controlled by the second enable signal; and a seventh multiplexer that is coupled to the third multiplexer and the second complex multiplier and that is controlled by the second enable signal.

In accordance with an embodiment of the present invention, an apparatus is provided. The apparatus comprises a reorder matrix having a constant geometry; a plurality of butterflies that are coupled in parallel to the reorder matrix, wherein each butterfly is symmetrical; and a memory that is coupled to the reorder matrix and each butterfly, wherein the reorder matrix, the plurality of butterflies, and the memory are configured to execute a split radix algorithm.

In accordance with an embodiment of the present invention, the apparatus further comprises a controller that is coupled to the memory and each butterfly.

In accordance with an embodiment of the present invention, each butterfly further comprises: a first datapath that generates real and imaginary portions of a first output signal, wherein the first datapath includes: a first summing circuit that receives real portions of a first signal and a second signal; and a second summing that receives imaginary portions of the first and second signals; and a second datapath that generates real and imaginary portions of a second output signal, wherein the second datapath includes: a third summing circuit that receives the real portions of the first and second signals; a multiplexer that is configured to select between the imaginary portion of the first signal and an inverse of the imaginary portion of the first signal based on a control signal; and a fourth summing circuit that receives the imaginary portion of the second signal and that is coupled to an output of the multiplexer, wherein the control signal selects at least one of a first operation and a second operation for the fourth summing circuit; and an output circuit that is coupled to third summing circuit and the fourth summing circuit and that is controlled by the control signal.

In accordance with an embodiment of the present invention, the plurality of butterflies further comprises a first set of butterflies and a second set of butterflies, and wherein the first and second summing circuits for each butterfly from the first set further comprise first and second adders, respectively that sum the real and imaginary portions of the first and second signals to generate the real and imaginary portions of the first output signal.

In accordance with an embodiment of the present invention, the third summing circuit for each butterfly in the first set is a subtractor.

In accordance with an embodiment of the present invention, the control signal further comprises a first control signal, and wherein a second control signal selects at least one of the first and second operations for the first, second, and third summing circuits for each butterfly from the second set, and wherein the first and second control signals selects at least one of a first operation and a second operation for the fourth summing circuit for each butterfly in the second set.

In accordance with an embodiment of the present invention, the first data path for each butterfly from the second set further comprises: a first latch that is coupled to first summing circuit and that is controlled by an enable signal; a second latch that is coupled to the second summing circuit and that is controlled by the enable signal; a complex multiplier that is coupled to the first and second latches; a fourth multiplexer that is coupled to the first summing circuit and the complex multiplier and that is controlled by the enable signal; and a fifth multiplexer that is coupled to the second summing circuit and the complex multiplier and that is controlled by the enable signal.

In accordance with an embodiment of the present invention, the enable signal further comprises a first enable signal, and wherein the complex multiplier further comprises a first complex multiplier, and wherein the second data path for each butterfly from the second set further comprises: a third latch that is coupled to the second multiplexer and that is controlled by a second enable signal; a fourth latch that is coupled to the third multiplexer and that is controlled by the second enable signal; a second complex multiplier that is coupled to the third and fourth latches; a sixth multiplexer that is coupled to the second multiplexer and the second complex multiplier and that is controlled by the second enable signal; and an eighth multiplexer that is coupled to the third multiplexer and the second complex multiplier and that is controlled by the second enable signal.

In accordance with an embodiment of the present invention, the memory further comprise a data memory, and wherein the apparatus further comprises a plurality of multiplexers, wherein each multiplexer is coupled between the data memory and at least one of the butterflies, and wherein each multiplexer is controlled by the controller; a post-processing circuit that is coupled to the data memory; and a results memory that is coupled to the post-processing circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 8:
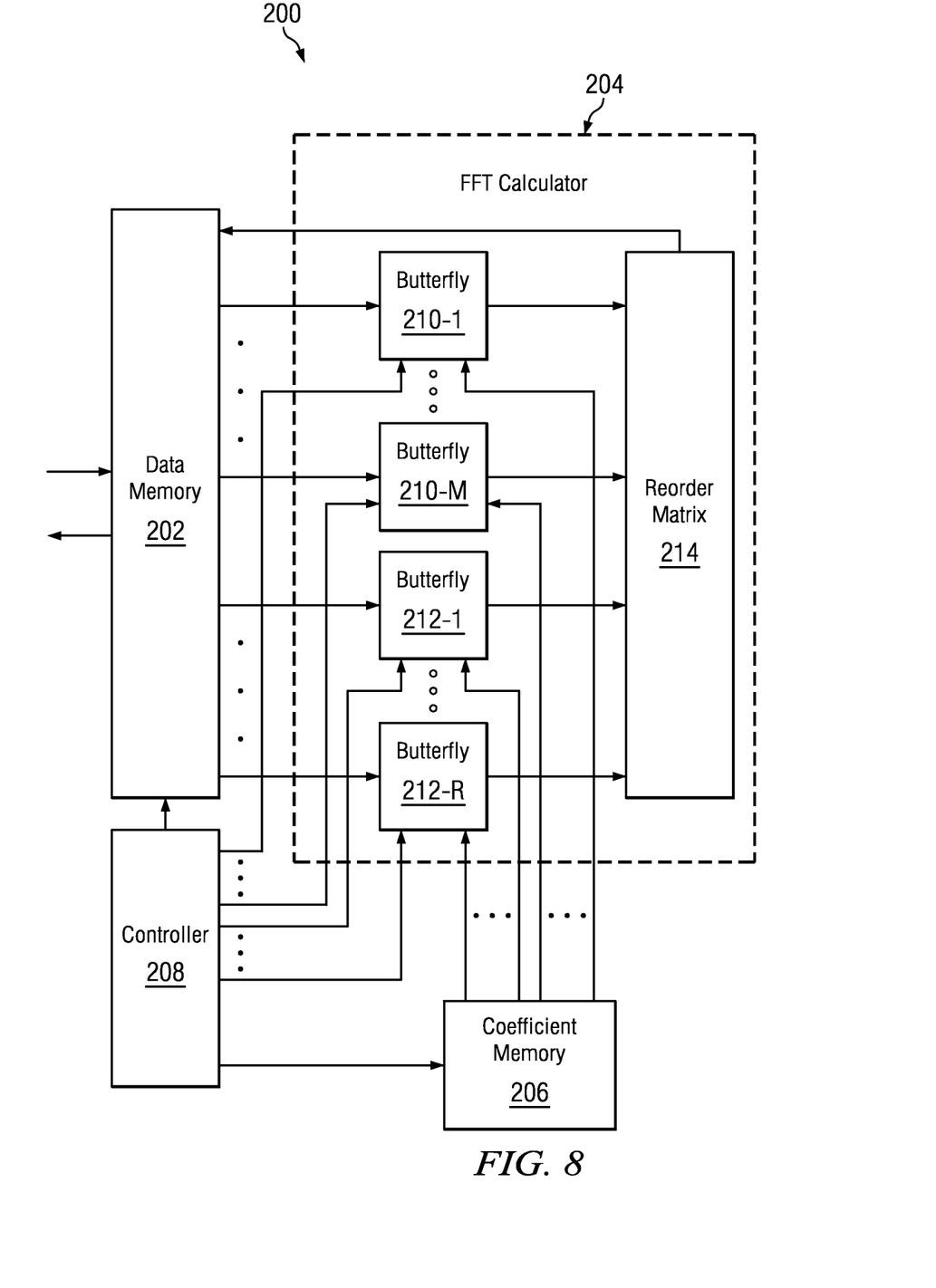
FIG. 8 is a diagram of an example of a system in accordance with an embodiment of the present invention.

Turning to FIG. 8, a system 200 that implements a split radix algorithm and architecture in accordance with a preferred embodiment of the present invention can be seen. The system 200 generally comprises data memory 202 (i.e., registers), an FFT calculator 204 (which generally comprises butterflies 210-1 to 210-M, butterflies 212-1 to 212-R, and reorder matrix 214), a coefficient memory 206, and a controller 208. As shown, butterflies 210-1 to 210-M and 212-1 to 212-R implement column-wise parallelization (as opposed to row-wise parallelization in conventional architectures). Each of these butterflies 210-1 to 210-M and 212-1 to 212-R is coupled to the reorder matrix 214 (which is generally a constant geometry interconnect having a wire fabric). For a split radix algorithm, using the traditional "L-shaped" butterfly in the constant geometry architecture (i.e., within system 200) results in low throughput because of the latencies associated with the "L-shaped" butterflies. So, to implement the constant geometry split radix architecture shown in system 200 (which generally avoids such latencies), two types of butterflies are employed (namely, butterflies 210-1 to 210-M and 212-1 to 212-R). These butterflies 210-1 to 210-M and 212-1 to 212-R are "symmetrical" in that these butterflies do not have the latency issues like the "L-shaped" butterflies.

Figure 9:
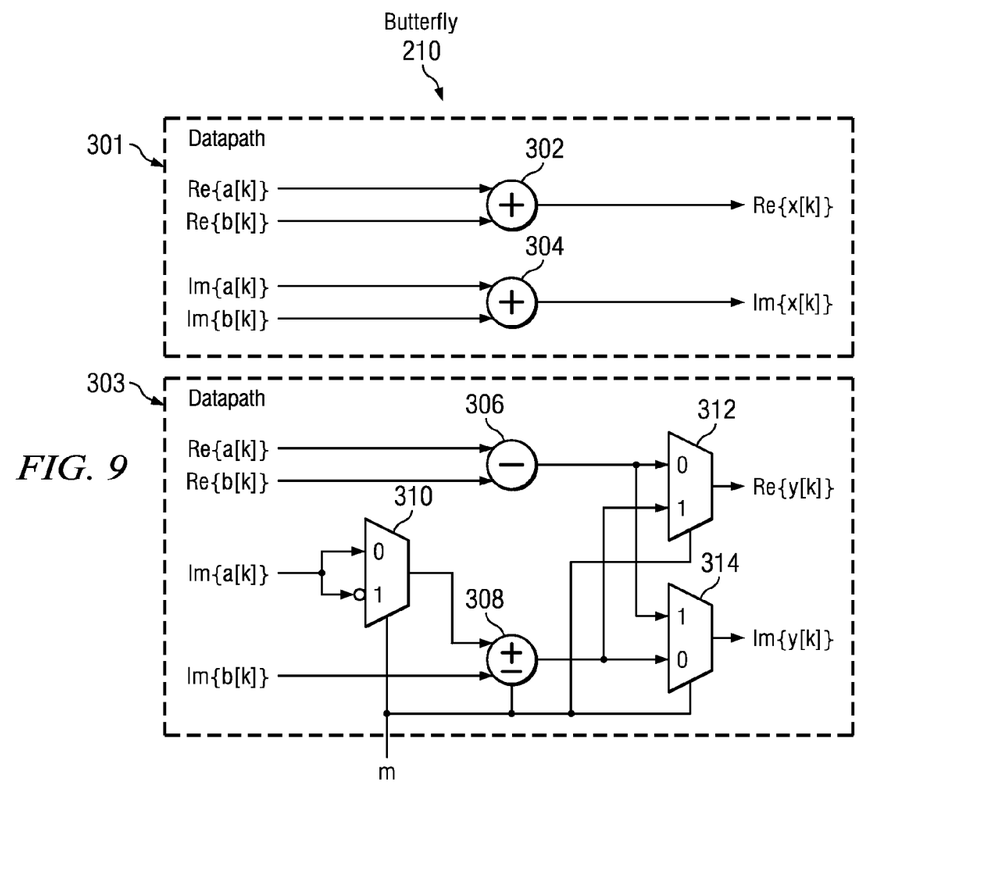
FIGS. 9 and 10 are diagrams of examples of butterflies employed in the system of FIG. 8.

In FIG. 9, an example of one of butterflies 210-1 to 210-M (hereinafter 210 for FIG. 9) can be seen. Butterfly 210 is generally comprised of datapaths 301 and 303, which do not include complex multipliers. Datapath 301 generally comprises summing circuits 302 and 304 (which are typically adders) that generate the real and imaginary portions of signal x[k] (namely, Re{x[k]} and Im{x[k]}, respectively) from the real and imaginary portions of signals a[k] and b[k] (namely, Re{a[k]}, Im{a[k]}, Re{b[k]}, and Im{b[k]}). Datapath 303 generally comprises summing circuit 306 (which is typically a subtractor), multiplexers 310, 312, and 314 (where multiplexers 312 and 314 can generally form an output circuit), and a summing circuit 308 and is controlled by control signal m. When control signal m is zero (m=0), multiplexer 310 outputs the imaginary portion of signal a[k] (i.e., Im{a[k]}), summing circuit 308 (where the operation of summing circuit 308 is controlled by control signal m) is set to be a subtractor, and multiplexers 312 and 314 are set to output the signals from summing circuits 306 and 308, respectively. Thus, for m=0, the output from datapath 303 is:

$$y[k]=a[k]-b[k]. \quad (6)$$

When control signal m is one (m=1), multiplexer 310 outputs an inverse of the imaginary portion of signal a[k] (i.e., Im{a[k]}), summing circuit 308 is set to be an adder, and multiplexers 312 and 314 are set to output the signals from summing circuits 308 and 306, respectively. Thus, for m=1, the output from datapath 303 is:

$$y[k]=i(a[k]-b[k]). \quad (7)$$

So, the configuration for butterfly 210 enables the multiplication by i ($\sqrt{-1}$) (when m=1) without the use of a complex multiplier.

Figure 10:
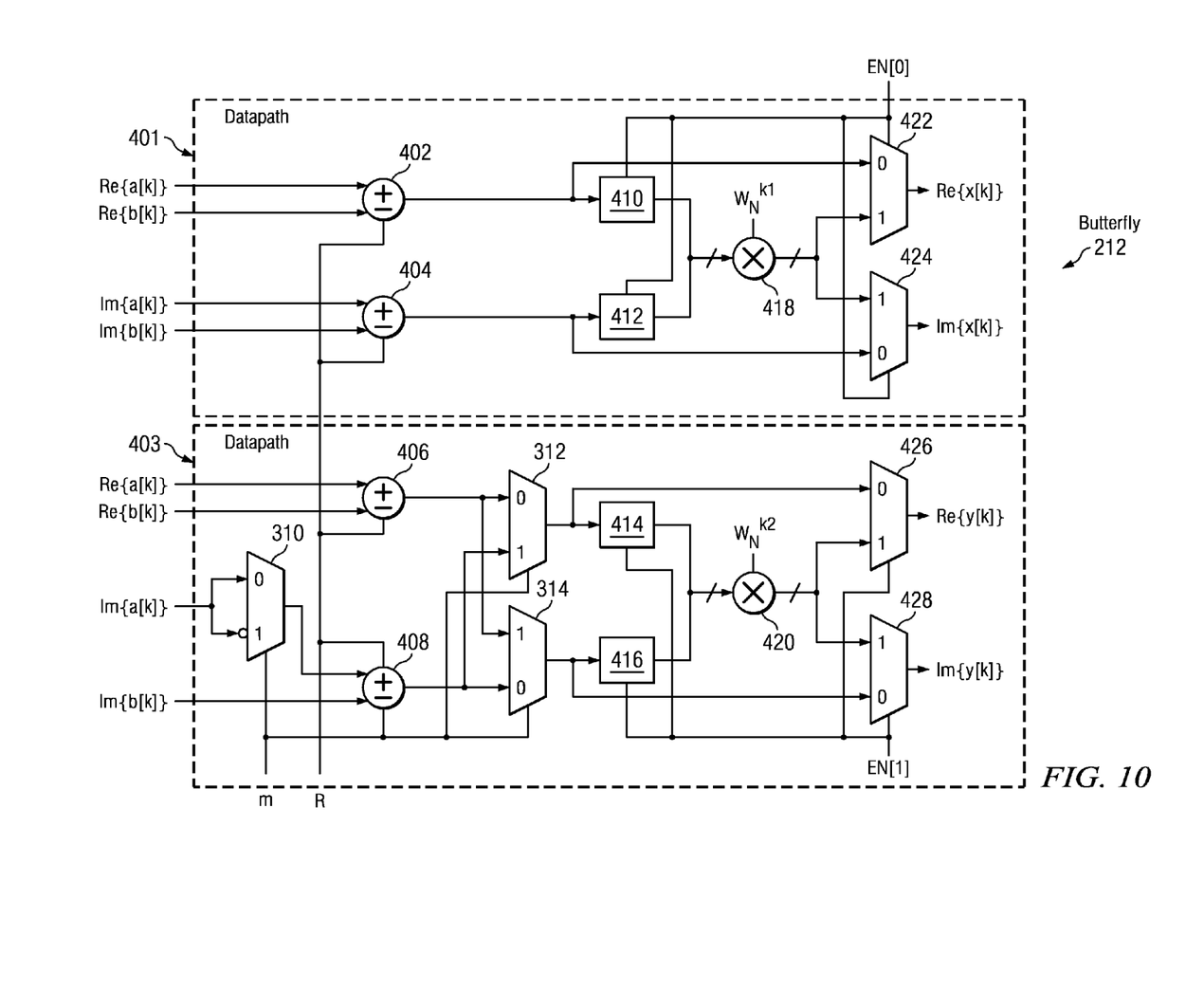

Turning to FIG. 10, an example of one of butterflies 212-1 to 212-R (hereinafter 212 for FIG. 10) can be seen. Butterfly 212 is generally comprised of datapaths 401 and 403, each of which is controlled by control signals m and R and enable signals EN[0] and EN[1]. While control signal R is zero, datapaths 401 and 403 operate like datapaths 301 and 303 in response to control signal m (as described above). Additionally, because these are operations (when control signal R is zero) are trivial multiplications (i.e., multiplication by 1 or i), switching of complex multipliers 418 and 420 can be avoided by use of latches 410, 412, 414, and 416. In particular, when control signal R is zero, the enable signals EN[0] and EN[1] are de-asserted (EN[0]=EN[1]=0) so that the value from the previous cycle is held. However, when control signals R and m are one and zero, respectively, (R=1, m=0), enable signals EN[0] and EN[1] are asserted (EN[0]=EN[1]=1) so that latches 410, 412, 414, and 416 become transparent and multiplexers 422, 424, 426, and 428 provide the outputs from multipliers 418 and 420. Thus, the outputs from datapath 401 and 403 are $$x[k] = (a[k] - b[k])W_N^{k1} \quad (8)$$

$$x[k] = (a[k] + b[k])W_N^{k2} \quad (9)$$

Figure 11:
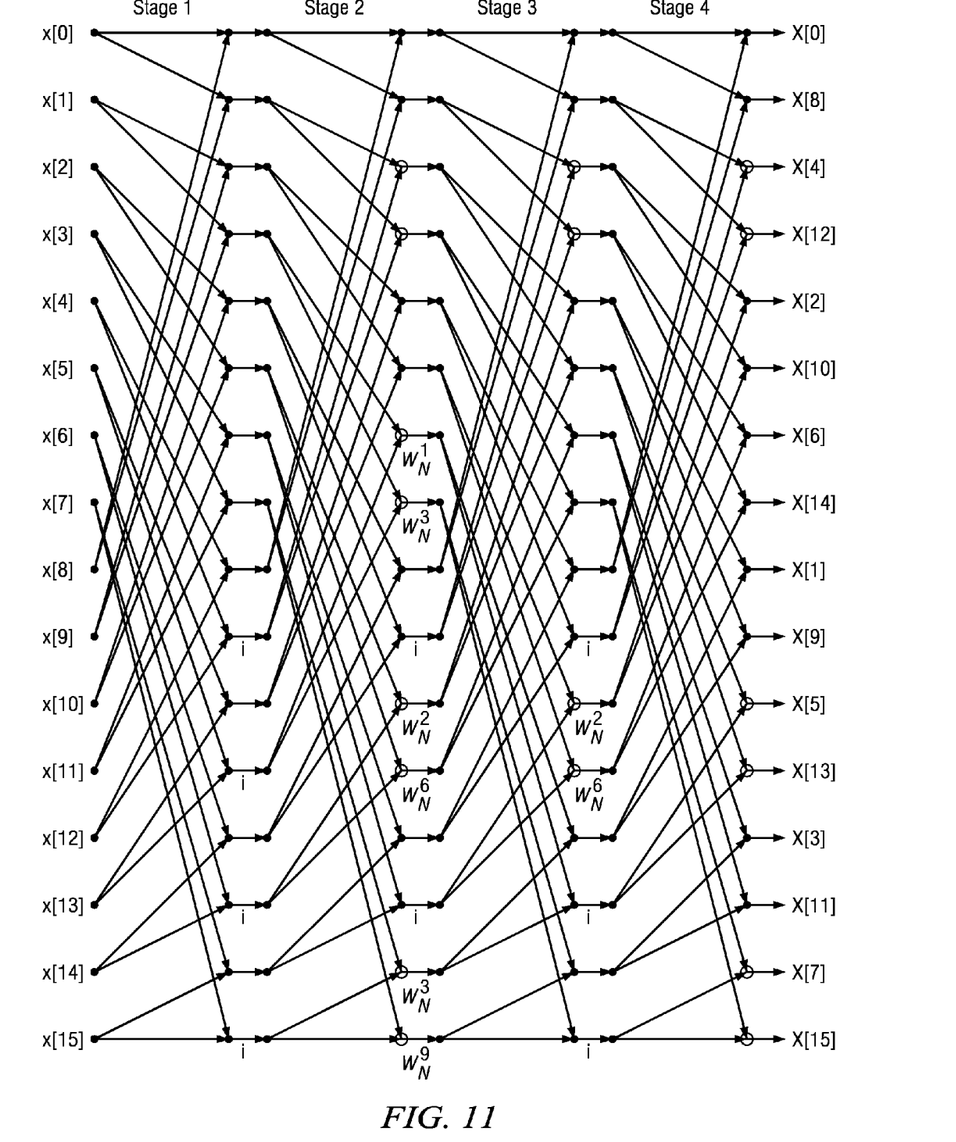
FIG. 11 is an example flow diagram for a 16-point constant geometry split radix architecture employed in the system of FIG. 8.

Turning back to FIG. 8, the numbers butterflies 210-1 to 210-M and 212-1 to 212-R along with the sequences for control signal signals m and R and enable signals EN[0] and EN[1] configure system 200 to operate as a split radix architecture and algorithm. An example, for an N-point FFT, there can be N/4 butterflies for each set of butterflies (i.e., butterflies 210-1 to 210-N/4 and butterflies 212-1 to 212-N/4), which would include N/2-2 complex multipliers. By comparison, a radix-2 FFT would have N/2 butterflies (i.e., butterfly 100) with N/2-1 complex multipliers. The sequences for control signal signals m and R and enable signals EN[0] and EN[1] can be stored in the controller 208 (which can, for example, be accomplished with a lookup table or LUT), while the twiddle factors ($W_N^k$) can be stored in the coefficient memory 206. With these sequences for control signal signals m and R and enable signals EN[0] and EN[1] and the constant geometry for the reorder matrix 214, the flow graph of FIG. 11 can be achieved (which is an example of the use of 16-point split radix algorithm with constant geometry). The correspondence between system 200 of FIG. 8 and the flow graph of FIG. 11 is as follows. Data memory 202 stores the input data x[n] and intermediate results after each stage of computation. As an example, butterfly 210-2 computes one row of the flow graph, and its location is shown by the black highlighted portion in the first and third stages. Similarly, butterfly 212-2 computes another row (highlighted in the second and fourth stages). Coefficient memory 206 provides the twiddle factors ($W_N^k$) while the controller 208 ensures the correct twiddle factor is given and computation performed. Reorder matrix 214 takes, for instance, outputs of butterfly 210-2 and places these outputs in the correct location before the next stage as indicated in FIG. 11.

Figure 12:
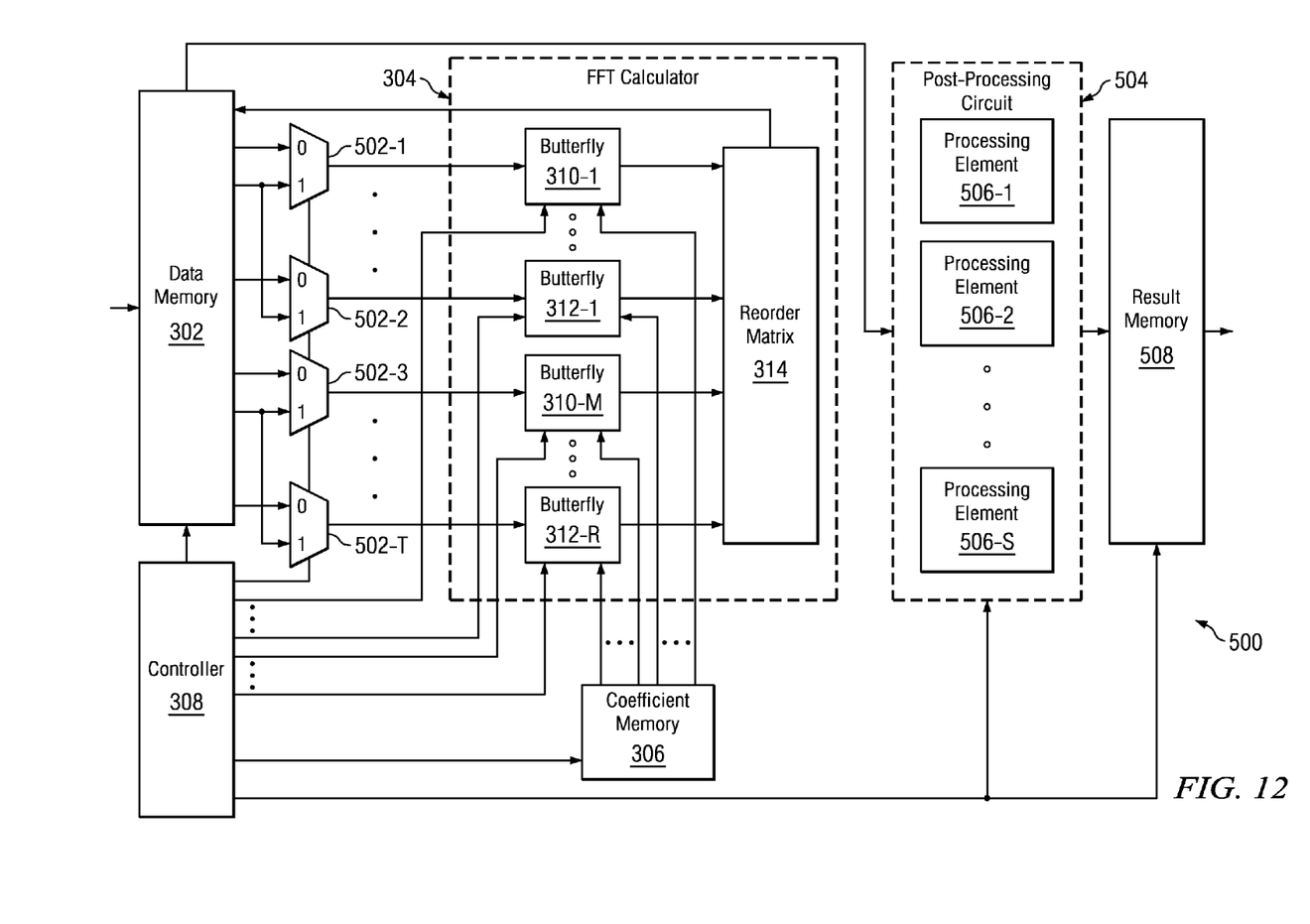
FIG. 12 is a diagram of an example of an extension of the system in FIG. 8 to process real-valued input samples in accordance with an embodiment of the present invention.

This architecture can also be extended to efficiently compute FFTs on real-valued inputs as shown in system 500 of FIG. 12. In system 500, multiplexers 502-1 to 502-T (which are controlled by controller 308) have been inserted between data memory 302 and FFT calculator 304 so as to allow the butterflies 310-1 to 310-M and 312-1 to 312-R to be used for two phases. In the first phase, the butterflies compute a complex-valued FFT on an N/2-point complex sequence formed from the even and odd samples of an N-point real sequence. Following this computation, the butterflies perform part of the post-processing (for A[k] and B[k] below) to convert the N/2-point complex FFT outputs to N-point real FFT results. The real-valued post-processing is as follows:

$$A[k] = \left(Z[k] + Z*\left[\frac{N}{2} - k\right]\right) \quad (10)$$

$$B[k] = \left(Z[k] - Z*\left[\frac{N}{2} - k\right]\right)W_N^k \quad (11)$$

$$X[k] = \frac{1}{2}((\text{Re}\{A[k]\} + \text{Im}\{B[k]\}) + i(\text{Im}\{A[k]\} - \text{Re}\{B[k]\})) \quad (12)$$

$$X\left[\frac{N}{2} - k\right] = \frac{1}{2}((\text{Re}\{A[k]\} - \text{Im}\{B[k]\}) - i(\text{Im}\{A[k]\} + \text{Re}\{B[k]\})) \quad (13)$$

where Z[k] are results of the N/2-point complex-valued FFT, and X[k] (with conjugate symmetry) are results of the N-point real-valued FFT. Normally, in a radix-2 FFT, A[k] and B[k] can be computed by a DIF butterfly with one complex multiplier in the bottom branch. Recall that in the split-radix architecture, each of butterflies 312-1 to 312-R and 212-1 to 212-R (hereinafter 312 and 212) includes two complex multipliers (i.e., 418 and 420), while butterflies 310-1 to 310-M and 210-1 to 210-M (hereinafter 310 and 210) do not include any complex multipliers. However, butterfly 310 can be used to compute A[k] and A[k+1], while the butterfly 312 computes B[k] and B[k+1], so the existing hardware can be fully utilized. The computation of X[k] and X[N/2−k] are the same in both radix-2 and split-radix designs. These computations can be completed by post-processing circuit 504 (which can include processing elements 506-1 to 506-S and/or can include a digital signal processor or DSP).

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a first datapath that generates real and imaginary portions of a first output signal, wherein the first datapath includes:
     a first summing circuit that receives real portions of a first signal and a second signal; and
     a second summing circuit that receives imaginary portions of the first and second signals; and
   a second datapath that generates real and imaginary portions of a second output signal, wherein the second datapath includes:
     a third summing circuit that receives the real portions of the first and second signals;
     a multiplexer that is configured to select between the imaginary portion of the first signal and an inverse of the imaginary portion of the first signal based on a control signal; and
     a fourth summing circuit that receives the imaginary portion of the second signal and that is coupled to an output of the multiplexer, wherein the control signal selects at least one of a first operation and a second operation for the fourth summing circuit; and
     an output circuit that is coupled to third summing circuit and the fourth summing circuit and that is controlled by the control signal.

2. The apparatus of claim 1, wherein the multiplexer further comprises a first multiplexer, and wherein the output circuit further comprises:

a second multiplexer that is coupled to the third and fourth summing circuits and that is controlled by the control signal; and
a third multiplexer that is coupled to the third and fourth summing circuits and that is controlled by the control signal.

3. The apparatus of claim 2, wherein the first and second summing circuits further comprise first and second adders, respectively that sum the real and imaginary portions of the first and second signals to generate the real and imaginary portions of the first output signal.

4. The apparatus of claim 3, wherein the third summing circuit is a subtractor.

5. The apparatus of claim 4, wherein the first operation is addition, and wherein the second operation is subtraction.

6. The apparatus of claim 2, wherein the control signal further comprises a first control signal, and wherein a second control signal selects at least one of the first and second operations for the first, second, and third summing circuits, and wherein the first and second control signals selects at least one of a first operation and a second operation for the fourth summing circuit.

7. The apparatus of claim 6, wherein the first data path further comprises:
a first latch that is coupled to first summing circuit and that is controlled by an enable signal;
a second latch that is coupled to the second summing circuit and that is controlled by the enable signal;
a complex multiplier that is coupled to the first and second latches;
a fourth multiplexer that is coupled to the first summing circuit and the complex multiplier and that is controlled by the enable signal; and
a fifth multiplexer that is coupled to the second summing circuit and the complex multiplier and that is controlled by the enable signal.

8. The apparatus of claim 7, wherein the enable signal further comprises a first enable signal, and wherein the complex multiplier further comprises a first complex multiplier, and wherein the second data path further comprises:
a third latch that is coupled to the second multiplexer and that is controlled by a second enable signal;
a fourth latch that is coupled to the third multiplexer and that is controlled by the second enable signal;
a second complex multiplier that is coupled to the third and fourth latches;
a sixth multiplexer that is coupled to the second multiplexer and the second complex multiplier and that is controlled by the second enable signal; and
a seventh multiplexer that is coupled to the third multiplexer and the second complex multiplier and that is controlled by the second enable signal.

9. The apparatus of claim 8, wherein the first operation is addition, and wherein the second operation is subtraction.

10. An apparatus comprising:
a reorder matrix having a constant geometry;
a plurality of butterflies that are coupled in parallel to the reorder matrix, wherein each butterfly is symmetrical; and
a memory that is coupled to the reorder matrix and each butterfly, wherein the reorder matrix, the plurality of butterflies, and the memory are configured to execute a split radix algorithm;
a controller that is coupled to the memory and each butterfly;
wherein each butterfly further comprises:
a first datapath that generates real and imaginary portions of a first output signal, wherein the first datapath includes:
a first summing circuit that receives real portions of a first signal and a second signal; and
a second summing that receives imaginary portions of the first and second signals; and
a second datapath that generates real and imaginary portions of a second output signal, wherein the second datapath includes:
a third summing circuit that receives the real portions of the first and second signals;
a multiplexer that is configured to select between the imaginary portion of the first signal and an inverse of the imaginary portion of the first signal based on a control signal; and
a fourth summing circuit that receives the imaginary portion of the second signal and that is coupled to an output of the multiplexer, wherein the control signal selects at least one of a first operation and a second operation for the fourth summing circuit; and
an output circuit that is coupled to third summing circuit and the fourth summing circuit and that is controlled by the control signal.

11. The apparatus of claim 10, wherein the multiplexer further comprises a first multiplexer, and wherein the output circuit further comprises:
a second multiplexer that is coupled to the third and fourth summing circuits and that is controlled by the control signal; and
a third multiplexer that is coupled to the third and fourth summing circuits and that is controlled by the control signal.

12. The apparatus of claim 11, wherein the plurality of butterflies further comprises a first set of butterflies and a second set of butterflies, and wherein the first and second summing circuits for each butterfly from the first set further comprise first and second adders, respectively that sum the real and imaginary portions of the first and second signals to generate the real and imaginary portions of the first output signal.

13. The apparatus of claim 12, wherein the third summing circuit for each butterfly in the first set is a subtractor.

14. The apparatus of claim 13, wherein the first operation is addition, and wherein the second operation is subtraction.

15. The apparatus of claim 14, wherein the control signal further comprises a first control signal, and wherein a second control signal selects at least one of the first and second operations for the first, second, and third summing circuits for each butterfly from the second set, and wherein the first and second control signals selects at least one of a first operation and a second operation for the fourth summing circuit for each butterfly in the second set.

16. The apparatus of claim 15, wherein the first data path for each butterfly from the second set further comprises:
a first latch that is coupled to first summing circuit and that is controlled by an enable signal;
a second latch that is coupled to the second summing circuit and that is controlled by the enable signal;
a complex multiplier that is coupled to the first and second latches;
a fourth multiplexer that is coupled to the first summing circuit and the complex multiplier and that is controlled by the enable signal; and
a fifth multiplexer that is coupled to the second summing circuit and the complex multiplier and that is controlled by the enable signal.

17. The apparatus of claim 16, wherein the enable signal further comprises a first enable signal, and wherein the complex multiplier further comprises a first complex multiplier, and wherein the second data path for each butterfly from the second set further comprises:
- a third latch that is coupled to the second multiplexer and that is controlled by a second enable signal;
- a fourth latch that is coupled to the third multiplexer and that is controlled by the second enable signal;
- a second complex multiplier that is coupled to the third and fourth latches;
- a sixth multiplexer that is coupled to the second multiplexer and the second complex multiplier and that is controlled by the second enable signal; and
- a seventh multiplexer that is coupled to the third multiplexer and the second complex multiplier and that is controlled by the second enable signal.

18. The apparatus of claim 10, wherein the memory further comprises a data memory, and wherein the apparatus further comprises:
- a plurality of multiplexers, wherein each multiplexer is coupled between the data memory and at least one of the butterflies, and wherein each multiplexer is controlled by the controller;
- a post-processing circuit that is coupled to the data memory; and
- a results memory that is coupled to the post-processing circuit.

* * * * *